Sept. 9, 1958     O. P. MONSON     2,851,244
VALVE SEAT CONSTRUCTION FOR FAUCETS OR THE LIKE
Filed Oct. 1, 1953
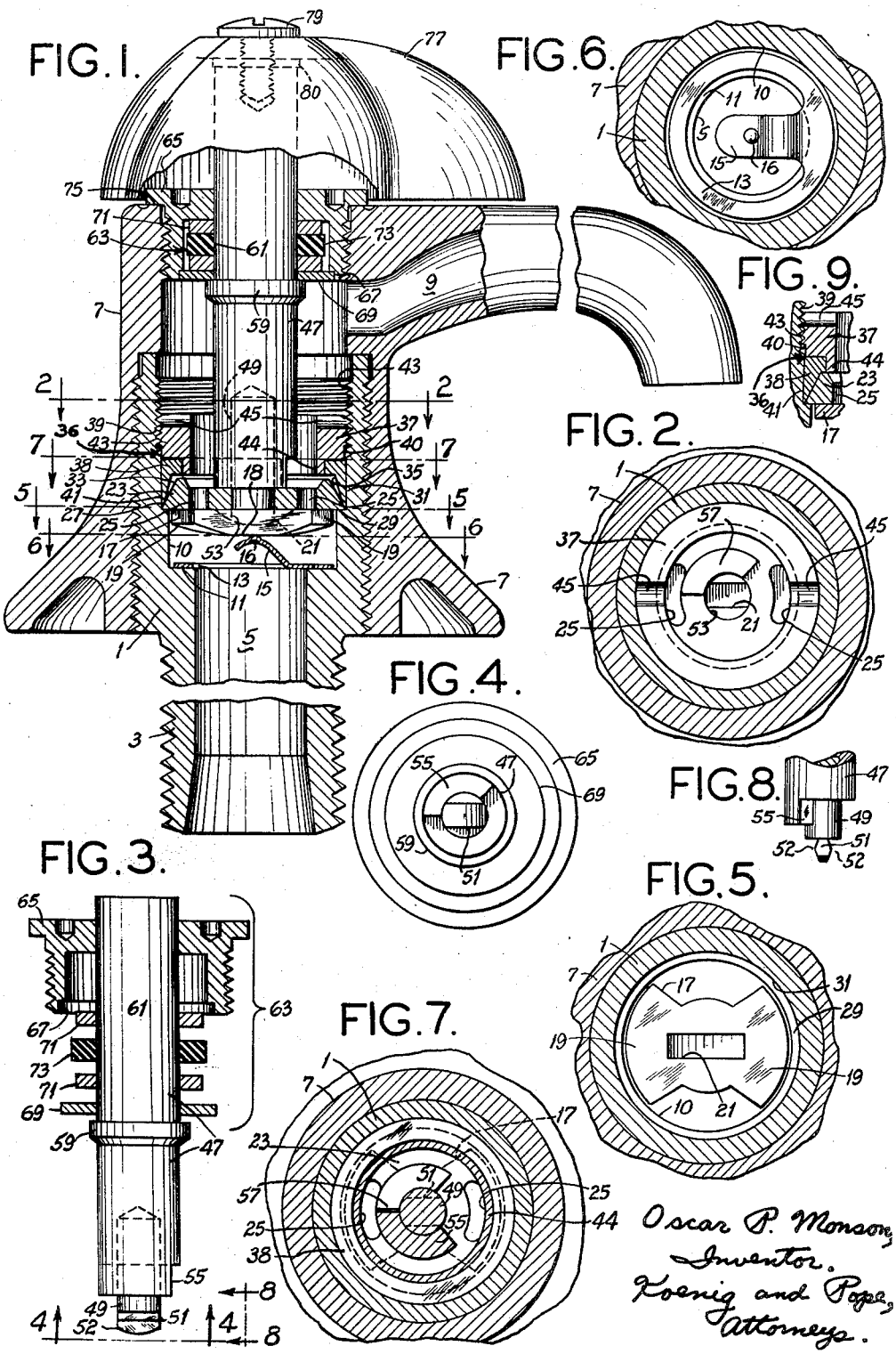
Oscar P. Monson,
Inventor.
Koenig and Pope,
Attorneys.

United States Patent Office 2,851,244
Patented Sept. 9, 1958

2,851,244

VALVE SEAT CONSTRUCTION FOR FAUCETS OR THE LIKE

Oscar P. Monson, Kenosha, Wis., assignor to Monson Equipment Company, Inc., Kenosha, Wis., a corporation of Wisconsin Application October 1, 1953, Serial No. 383,479

1 Claim. (Cl. 251—363)

This invention relates to a valve seat construction for faucets or the like, and more particularly to improved means for holding down a valve seat in a faucet or the like and preventing leakage past the seat.

This application is a continuation-in-part of my copending United States patent application entitled Faucet Construction, Serial No. 232,129, filed June 18, 1951, issued as patent 2,696,363, December 7, 1954, and the invention involves an improvement upon the means shown therein for holding down the valve seat and preventing leakage past the seat, the object being to provide a positive and permanent watertight seal without requiring the application of undesirably high screw-turning torque in assembling the parts. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, Fig. 1 is a vertical section through a faucet embodying the invention;

Fig. 2 is a horizontal section taken on line 2—2 of Fig. 1 but with a key stem and seal assembly removed from the faucet, showing certain valve ports closed;

Fig. 3 is an exploded side elevation of a key stem and seal assembly removed from the faucet;

Fig. 4 is a bottom end view of the assembly shown in Fig. 3, being viewed from line 4—4 on Fig. 3;

Fig. 5 is a horizontal section takn on line 5—5 of Fig. 1;

Fig. 6 is a horizontal section taken on line 6—6 of Fig. 1;

Fig. 7 is a horizontal section taken on line 7—7 of Fig. 1;

Fig. 8 is a view of a key end, being observed from line 8—8 of Fig. 3; and,

Fig. 9 is a fragment of Fig. 1 illustrating a moved position of parts.

Similar reference characters indicate corresponding parts throughout the several views of the drawings.

Referring now more particularly to the drawings, there is shown at numeral 1 the inner valve body. The body 1 has a tubular threaded extension 3 for attachment to a suitable support and to a liquid supply line such as a waterpipe. This provides the inlet 5 for the faucet. The inner body 1 is threaded into an outer body 7 having an outlet 9.

At the upper end of the inlet 5 is a counterbore 10 having a seat 11 for the reception of an annular spring washer 13. Washer 13 has a central spring finger 15 which biases upward against the bottom of a rotary valve plate 17. A small raised tip 16 of the finger 15 centrally engages a small central flat 18 on the bottom of the valve plate 17. Valve plate 17 has two lobes 19. On its bottom it is crowned with said flat at the apex. It is flat-lapped on its upper surface and centrally in this surface carries a notch 21. It is biased by the spring finger 15 against the flat-lapped bottom of a stationary valve seat 23. The seat has two ports 25 which upon 90° rotation of the valve plate 17 are covered and uncovered by the lobes 19. The limited contact between the tip 16 and flat 18, which contact is on the axis of rotation, reduces the frictional torque between the spring and valve plate. The maximum diameter of plate 17 is slightly less than that of the flat bottom of seat 23, thus allowing some free floating lateral movement of the plate. Plate 17 and seat 23 are preferably composed of a tantalum-tungsten alloy known as "Tantung" which provides an extremely long operating life of the moving contact surface without galling.

The periphery 27 of the bottom surface of the valve seat 23 is supported upon the shouldered bottom end 29 of a second counterbore 31. This second counterbore leads to the outlet 9. The valve seat 23 is exteriorly made conical (as shown at 33) for engagement by an interior chamfered flare 35 of a hold-down bushing 36. Bushing 36 is made in two parts, an upper part 37 and a lower part 38. The upper part 37 consists of a lock screw in the form of a ring of a relatively hard metal, such as brass, having an exterior raised thread 39 below which is an unthreaded cylindric portion 40 sized for a close fit in the counterbore or chamber 31. The lower part 38 consists of a washer of soft metal, such as lead, which is formed with the interior chamfered flare 35. Prior to assembly, as is about to be described, the angle of the flare or taper 35 is less than the taper 33 of the valve seat 23. The outer periphery of washer 38 is cylindric, having a close fit as indicated at 41 in the counterbore 31 just below the threads 43 in the counterbore. The lock screw 37 has a reduced-diameter extension 44 on its bottom received with a close fit in the central opening in the washer 38. The top of the lock screw has slots 45 for accepting a spanner wrench for threading it into place. Assembly is carried out by inserting the valve seat 23 on the shoulder 29, inserting washer 38 with its inner taper 35 on the outer taper 33 of seat 23, and threading down the lock screw 37. As the screw is threaded down, the wedging action of taper 35 on taper 33 expands the lower chamfered end of the washer into tight engagement at 41 with the cylindric wall of the counterbore 31 below threads 43, and the washer is also mashed into tight engagement with the seat. This is readily accomplished without requiring undesirably high force to turn the screw since the washer is made of a soft metal such as lead and hence is readily deformable. Fig. 1 illustrates the shape of the washer with minimum deformation, and it will be apparent therefrom how the washer becomes mashed on threading down the lock screw. Fig. 9 illustrates a condition of maximum deformation, showing how the soft metal fills in the space around the valve seat 23. Any intermediate deformation will effect a proper seal so that the value of torque required is neither high nor critical. Thus, a permanent watertight seal is effected both between washer part 38 of bushing 36 and the valve seat 23 and between the washer part 38 and the counterbore 31. It will be understood that parts 37 and 38 constituting the bushing 36 may be preassembled by insertion of extension 44 in the central opening of part 38 before these parts are inserted in the counterbore 31. It will also be understood that before the seat 23 is inserted, the spring washer 13 and valve 17 will have been inserted below it, so that upon tightening down the valve seat the spring finger 15 is compressed, thus springingly to force the valve 17 against the bottom of the seat 23.

The flat lapping of the upper surface of the rotary valve plate 17 and of the bottom of the valve seat 23 is preferably of an accuracy (within a micro-inch) such that when they are wrung together the intervening air is sufficiently excluded to cause them to remain in contact so that they may be dropped together as a unit into the counterbore 31 above the spring washer 13 in the counterbore 10. This considerably facilitates assembly.

Rotation of the valve 17 is accomplished by a valve stem, which consists of a cylindric member 47 in the end of which is coaxially press fitted a key 49. This key is provided at its lower end with a reduced portion 51 having side edges 52, as shown in Fig. 8. The key may be applied to the notch 21 by insertion through a central opening 53 in the valve seat 23. The edges 52 engage the sides of the notch 21 without binding thus allowing the plate 17 to float between the spring 13 and seat 23, without interference from possible misalignment of member 51. A segmental step collar 55 is provided at the lower end of the stem 47 around the key 49 which engages a stationary segmental step collar 57 on the top of the valve seat 23, as shown in Fig. 7. The arcuate extent of the steps is such that, upon turning the valve stem 47 through 90°, the valve 17 may be driven by key 49 from one limiting position with its lobes 19 covering the ports 25 to another limiting position with its lobes uncovering these ports. The stem 47 includes a shoulder 59.

Above the shoulder the stem 47 passes through a stem seal assembly 63 which is constituted by a shouldered and threaded cup-shaped nut or gland 65 for threading into a threaded upper opening of the body 7. The cup on the underside of the nut is provided with a step 67 for a pressed-in enclosing washer member 69. Within the nut 65 and held in place by the washer 69 are two sealing washers 71 which are composed of a relatively nonresilient material such as, for example, fibre, so-called melamine glass, or the like. These washers have a relatively loose fit around the stem 47 and do not hub it. They have sandwiched between them a resilient tension ring 73 composed of a suitable resilient material such as one of the synthetic rubbers, one of which is known under the trade name of Neoprene. The ring 73 is sized to be tensioned around stem 47 and to hub it. Washer 69 pushes washers 71 against tension ring 73, compressing it axially. Thus when the seal assembly 63 is pushed down over the stem 47, the washer 69 loosely engages the shoulder 59. Since the tension ring 73 adheres to the stem 47, water cannot leak out past the stem. Any that tends to leak out around the sandwich must traverse two sealing engagements by washers 71. There can be no wear on the tension ring 73 because it adheres to and moves with the stem 47 and also carries with it the protective washers 71 by reason of the axial compression on the sandwich. Thus members 47, 71 and 73 rotate as a unit, the resultant rubbing engagements being endwise.

From the above, the advantages of the invention will be clear. The stationary valve seat 23 is strongly held in a permanently sealed position on the seat 29 by means of the two-part bushing 36. The wedging action due to the exterior conical shape of the valve seat 23 and the inside flaring chamfer 35 of the lower part 38 of the bushing effects an extremely reliable watertight seal between the parts 23, 38 and 1 without requiring the application of unduly high torque to turn the screw 37, nor is the torque value critical.

The seal by the tension ring 73 around the key stem and between it and the washers 71 avoids all relative motion between parts 71, 73 and 61 and eliminates all packing wear by the stem. While there is relative motion between the upper washer 71 and the body 7, and between the lower washer 71 and the washer 69, any resulting small amount of wear is automatically taken up by the tendency of the axially compressed ring 73 to expand axially.

Assembly and disassembly are convenient. To assemble, it is merely necessary to drop the washer 13 in position on the seat 11, followed by insertion of the wrung-together valve 17 and valve seat 23. The assembly of parts 37 and 38 is then screwed home by application of a spanner wrench to the slots 45. This does not require excessive force, due to part 38 being made of a soft, readily mashed metal such as lead. The stem seal assembly 63 may then be brought together on stem 47, bringing it to a seat on the shoulder 59. The reduced end 51 of the key 49 is inserted into the notch 21 through the opening 53 and the nut 65 is then screwed home in the body 7. A control handle 77 is then fastened to the upper end of portion 61 by a screw 79 and lock means 80. Disassembly is effected by a simple sequence of operations inverse to those above described. Should the seal parts 71, 73 after long use deteriorate, they are easily removable from the stem for replacement.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A valve seat construction comprising a body providing a cylindric chamber having a step forming a circular shoulder, a circular valve seat supported by the shoulder, said seat having an exterior inward taper from said shoulder, said chamber having an unthreaded cylindric wall portion extending from the shoulder and surrounding said inward taper of the seat, said chamber being threaded above said wall portion, a two-part hollow circular bushing one part of which consists of a washer of relatively soft material having a cylindric outer periphery which has a close fit in said unthreaded wall portion of the chamber, the external diameter of the washer being less than the inside diameter of said threads in the chamber, said washer having a first portion surrounding said seat and a second portion overlying said seat, said first portion having an inside flare engageable with said inward taper of said seat, said second portion having a central cylindrical opening, and the other part of which consists of a relatively hard metal locking screw in the form of a ring having an exteriorly threaded portion co-operating with the threads in the chamber and backing the washer, the locking screw having an unthreaded cylindric portion of smaller diameter than the outer diameter of its threaded portion engaging the washer, said screw being threaded in the chamber to a point where it compresses the washer and wedges the said first portion of the washer with the flare between the taper of said seat and the cylindric wall portion of the chamber surrounding said taper, the screw also having a reduced-diameter cylindric extension from its said unthreaded cylindric portion having a close fit in the said central cylindrical opening of the said second portion of the washer.

References Cited in the file of this patent

UNITED STATES PATENTS

| | | |
|---|---|---|
| 2,143,399 | Abercrombie | Jan. 10, 1939 |
| 2,505,992 | Rike | May 2, 1950 |
| 2,590,702 | Holmes | Mar. 25, 1952 |
| 2,617,554 | Smith | Nov. 11, 1952 |
| 2,665,875 | MacGregor | Jan. 12, 1954 |
| 2,696,363 | Monson | Dec. 7, 1954 |